United States Patent
Bennett et al.

(10) Patent No.: US 12,371,623 B2
(45) Date of Patent: Jul. 29, 2025

(54) DEMULSIFIER OR WATER CLARIFIER ACTIVITY MODIFIERS

(71) Applicant: Baker Hughes, a GE company, LLC, Houston, TX (US)

(72) Inventors: Geoff Bennett, Devon (CA); Jacqueline Behles, Houston, TX (US); Sean Stewart, St. Albert (CA)

(73) Assignee: Baker Hughes, a GE company, LLC, Houston, TX (US)

( * ) Notice: Subject to any disclaimer, the term of this patent is extended or adjusted under 35 U.S.C. 154(b) by 74 days.

(21) Appl. No.: 17/480,005

(22) Filed: Sep. 20, 2021

(65) Prior Publication Data

US 2022/0002625 A1 Jan. 6, 2022

Related U.S. Application Data

(62) Division of application No. 15/974,383, filed on May 8, 2018, now Pat. No. 11,124,711.

(60) Provisional application No. 62/503,698, filed on May 9, 2017.

(51) Int. Cl.
*C10G 33/04* (2006.01)
*B01D 17/04* (2006.01)

(52) U.S. Cl.
CPC ........... *C10G 33/04* (2013.01); *B01D 17/047* (2013.01)

(58) Field of Classification Search
None
See application file for complete search history.

(56) References Cited

U.S. PATENT DOCUMENTS

| | | | |
|---|---|---|---|
| 2,159,312 A | 5/1939 | Blair, Jr. | |
| 2,915,476 A | 12/1959 | Shen et al. | |
| 3,912,715 A * | 10/1975 | Jarowenko | C08B 31/006 162/175 |
| 4,088,600 A * | 5/1978 | Tutein | C10G 33/04 106/206.1 |
| 4,581,058 A * | 4/1986 | Fenyes | A01N 47/28 514/254.01 |
| 5,169,562 A * | 12/1992 | Mitchell | C10G 33/04 210/708 |
| 5,248,449 A | 9/1993 | Mitchell et al. | |
| 5,643,460 A | 7/1997 | Marble et al. | |
| 11,174,374 B2 * | 11/2021 | Weisner | C08L 3/04 |
| 2005/0061462 A1 * | 3/2005 | Johansson-Vestin | D21H 21/10 162/168.3 |
| 2007/0187330 A1 | 8/2007 | Whittaker | |
| 2009/0176675 A1 * | 7/2009 | Peffly | A61Q 5/12 510/121 |
| 2011/0147306 A1 | 6/2011 | Polizzotti et al. | |
| 2011/0247775 A1 * | 10/2011 | Sutman | D21H 17/56 524/47 |
| 2012/0059088 A1 | 3/2012 | Hilfiger et al. | |
| 2014/0124454 A1 * | 5/2014 | Nichols | C02F 1/5272 210/732 |
| 2014/0224733 A1 | 8/2014 | Osness et al. | |
| 2015/0307377 A1 * | 10/2015 | Crowther-Alwyn | C02F 1/54 210/738 |
| 2015/0307788 A1 | 10/2015 | McDaniel et al. | |
| 2015/0376038 A1 * | 12/2015 | Wietholter | C02F 1/5236 210/702 |
| 2016/0032197 A1 | 2/2016 | Weisner | |

FOREIGN PATENT DOCUMENTS

| | | | | |
|---|---|---|---|---|
| CA | 2068013 | | 7/1993 | |
| CN | 1149505 | | 5/1997 | |
| CN | 101053799 | | 10/2007 | |
| CN | 103865438 A | * | 6/2014 | |
| CN | 103923164 A | * | 7/2014 | |
| DE | 2349231 | | 4/1975 | |
| GB | 1438427 | | 6/1976 | |
| GB | 1509042 | | 4/1978 | |
| WO | WO-2014016529 A1 | * | 1/2014 | ............ C02F 1/5263 |
| WO | 2014144025 | | 9/2014 | |
| WO | WO-2017142827 A2 | * | 8/2017 | ......... B01D 17/0217 |

OTHER PUBLICATIONS

Machine translation of WO 2014/016529 A, retrieved Dec. 2023 (Year: 2023).*
Machine translation of CN 103923164 A, retrieved May 2024 (Year: 2024).*
Machine translation of CN 103865438 A, retrieved May 2024 (Year: 2024).*

* cited by examiner

*Primary Examiner* — Katarzyna I Kolb
(74) *Attorney, Agent, or Firm* — Baker Hughes Company (57) ABSTRACT

Adding a cationic starch and/or an anionic starch to a conventional demulsifier or water clarifier reduces activity of the resulting product without losing demulsifier or water clarifier performance.

8 Claims, 9 Drawing Sheets

DEMULSIFIER OR WATER CLARIFIER ACTIVITY MODIFIERS

CROSS-REFERENCE TO RELATED APPLICATION

This application is a divisional of U.S. patent application Ser. No. 15/974,383 filed May 8, 2018 which issued as U.S. Pat. No. 11,124,711 on Sep. 21, 2021, which in turn claims the benefit of U.S. Provisional Patent Application No. 62/503,698 filed May 9, 2017, both of which are incorporated herein by reference in their entireties.

TECHNICAL FIELD

The present invention relates to methods and compositions for demulsifying water and oil emulsions, and more specifically relates to methods and compositions for modifying demulsifiers to reduce activity while maintaining the same performance.

BACKGROUND

The breaking of water-in-crude emulsions is still a challenge in the petroleum industry. A water-in-oil emulsion results from the mixing of a water-based fluid and crude oil, which are two immiscible fluids. Water or brine typically accompany crude oil during its recovery from a subterranean reservoir, and additional water may also be added to aid in secondary oil recovery as the well nears the end of production. At the refinery, additional water may be emulsified into the crude oil in an effort to extract salts and fine solids from the crude oil. The water-based fluid may form droplets within the crude oil, i.e. the water-based fluid droplets are the discontinuous phase, and the oil-based fluid (e.g. crude oil) is the continuous phase.

The presence of the emulsion is beneficial for the extraction process, but it poses major problems for the additional refining steps. The emulsified water may corrode refinery equipment, such as overhead distillation columns, and poison catalysts as a result of dissolved salts. The viscous emulsions can foul machinery, and entrained solids can accumulate in certain unit operations. Crude oil may be lost when trying to dispose or rid the water from the water-in-crude emulsion.

Conventional demulsifiers have characteristics of activity and performance. Activity is defined herein as the percentage of intermediates in the final product. Performance is defined herein as how the demulsifier works in a given system at a particular concentration.

Water clarification may be defined as a process of removing colloidal materials from water to recover more pure water. In a non-limiting embodiment, a chemical coagulant, e.g. alum, or a chemical flocculant, e.g. a polymer, or both are added to the water. Colloidal particles attach to each other and to the additives, and clumps grow to sufficient size that they can be separated from the water by filtration, gravity settling, hydrocycloning, or centrifuging. Clarification may be a final step in a closed mud system when a clear effluent is needed.

It would be desirable if better demulsifiers, water clarifiers, and methods for using the same were developed for separating at least a portion of foulants from the water-in-crude emulsions.

SUMMARY

There is provided, in one non-limiting embodiment, a method of modifying demulsifier or water clarifier activity that includes adding a cationic starch and/or an anionic starch to a demulsifier or water clarifier in an amount effective to reduce the activity of the demulsifier or water clarifier without substantially reducing its performance.

There is additionally provided, in another non-restrictive version, a modified demulsifier or water clarifier that includes a demulsifier or water clarifier and a cationic starch and/or an anionic starch present in an amount effective to reduce the activity of the demulsifier or water clarifier without substantially reducing its performance.

DETAILED DESCRIPTION

It has been discovered that the addition of a cationic starch to a conventional demulsifier or water clarifier allows for the reduction in the activity of the demulsifier or water clarifier by an unexpectedly greater amount but without losing the performance of the demulsifier, and rather gaining improved performance and cleaner water. In a non-limiting example, the addition of 1-3 wt % of a cationic starch to a conventional demulsifier will reduce its activity, however, this synergistic product combination demonstrates a performance greater than the conventional demulsifier with activities that are 2× to 2.5× greater. In this example, the final product activity was 19%. In other words, the activity reduction is greater than what would be expected from simple dilution; which is defined as synergism herein. That is, the demulsifier or water clarifier still performs well at the lower activity rate and in some cases, better than the original demulsifier or water clarifier used alone. Again, activity is defined as the percentage of active demulsifier or water clarifier intermediates in the final product. Performance is defined as how the demulsifier or water clarifier works in a given system at a particular concentration. By "without substantially reducing performance" is meant that performance is within 10%, alternatively within 5% of the performance without the addition of the modifier added to the demulsifier or water clarifier.

Normally, to winterize this conventional demulsifier or water clarifier there are added alcohols and other low freezing point solvents to allow the material to stay flowable and pumpable at −40° C. Suitable alcohols and solvents include, but are not necessarily limited to, methanol, isopropyl alcohol, ethylene glycol monobutyl ether, and combinations thereof. In some cases, DDBSA and/or a co-solvent may be necessary to stabilize a product at low temperatures. Not all demulsifier or water clarifier products need to be winterized, so in those cases, alcohols are not required.

Typically, demulsifiers may be used to separate or break emulsions, such as separating water from oil in a water-in-oil emulsion. Conversely the demulsifier may separate the oil from an oil-in-water emulsion. The type of demulsifier used for a particular emulsion may depend on the type of emulsion, which may be water-in-oil or oil-in-water.

It is believed that the demulsifiers that can be modified by the methods herein may be any conventional demulsifier, which may number from ten to over 1,000, including, but not necessarily limited to anionic demulsifiers, cationic demulsifiers, non-ionic demulsifiers, crosslinked demulsifiers, acid based demulsifiers, and/or amphoteric demulsifiers. Specific examples include, but are not necessarily limited to, alkylphenol derivatives, ammonium alkylaryl sulfonates, alkylaryl sulfonates, alkylarylsulfonate amine salts, amine polymers, epoxy resins, furandione polymers, oxyalkylated alkanolamines, oxyalkylated alkylphenolic resins, oxyalkylated polyamines, oxyalkylated imine polymers, oxyalkylated polymers, oxyalkylated polyols, oxyalkylated ether sulfate salts, (methyl) oxirane polymers, phenolic polymers, polyether polyols, polyoxyalkylene glycols, polyurethanes, polyoxyalkylenes, polyethers, polyol esters, polyesters, polyglycol diepoxides, polyglycol esters, and mixtures thereof. One particularly suitable demulsifier type is oxyalkylated alkylphenolic resin and polyoxyalkylene glycol.

Typical water clarifiers may include, but not necessarily be limited to, a polycondensate based on N,N'-bis[3-(dimethylamino)propyl]urea, polyacrylate copolymers, polyacrylamide copolymers, poly(acrylate/acrylamide) copolymers, polycondensate based on alkanolamines, dithiocarbamates, in particular polycondensates based on triethanolamines, and combinations thereof. Metal ions are also good water clarifiers, including, but not necessarily limited to, zinc, aluminum, iron, and zirconium based metal ions. These ions may be present in salts including, but not necessarily limited to, zinc chloride, zirconium chloride, aluminum chloride, and the like.

Suitable demulsifier or water clarifier activity modifiers include, but are not necessarily limited to, anionic starches and cationic starches. Specific suitable starches include, but are not limited to, biopolymers, plant starches, potato starches, corn starches, rice starches, tapioca starches, and mixtures thereof. In some non-limiting embodiments, these are cationic starches and/or an anionic starch with a quaternized polyamine.

In one non-limiting embodiment the amount of the modifier added to the demulsifier or water clarifier ranges from about 0.1 independently to about 20 wt %, based on the amount of demulsifier or water clarifier; alternatively from about 0.5 independently to about 10 wt %, and in another non-restrictive version from about 1 independently to about 3 wt %. As used herein with respect to a range, the term "independently" means that any threshold may be used with any other threshold to form a suitable alternative range. For example, the proportion of modifier added to the demulsifier or water clarifier may range from about 1 to about 10 wt %, or from about 3 to about 20 wt %.

In one non-limiting embodiment the activity of the demulsifier or water clarifier is reduced to at least 16%; in a different non-limiting embodiment to at least 13%; alternatively to at least 10%; in another non-restrictive form to at least 7%; in another non-restrictive version to at least 5%; and in another alternative to at least 2%.

There may be an issue in getting the modifier into solution with the demulsifier or water clarifier without causing separation as the modifier is sensitive to the alcohols that are typically used to winterize a product—that is, keep it stable (non-separating) at lower temperatures. It has been further discovered that the order of mixing may be very sensitive in formulating these products; i.e. there may be separation if the correct order of addition is not followed. However, it is difficult to specify an exact order of addition since the order will depend on the specific formulation. Some of the blends are not as sensitive to the order of addition, whereas others are quite specific that the solvent needs to be present first, followed by the surfactant stabilizers, and then the modifier, and finally the demulsifier or water clarifier. Other formulations may have a different order of addition.

Complete separation and/or removal of the water from the water-in-oil emulsion is desirable, but it should be appreciated that complete separation and/or removal is not necessary for the methods and fluid compositions discussed herein to be considered effective. Success is obtained if more water is separated from the water-in-oil emulsion by adding the demulsifier to the water-in-oil emulsion as compared to the absence of the demulsifier. Alternatively, the methods and fluid compositions described are considered successful if a majority of the water is separated from the water-in-oil emulsion. Similarly, complete water clarification is not considered the only measure of success, but of course a goal is to clarify water as much as possible.

In a non-limiting embodiment, the water-in-oil emulsion may be a water-in-crude emulsion. The crude-based phase of the emulsion may be a heavy crude, or light oil crude, including but not necessarily limited to Canadian crude, Venezuelan crude, Murray crude, and the like. The water-based phase of the water-in-oil emulsion may be a water-based fluid or brine-based fluid. In a non-limiting embodiment, the demulsifier may be added to the water-based phase and/or the oil-based phase of the water-in-oil emulsion. Alternatively, the demulsifier may be in a solution with an organic solvent, and the solution may be added to the oil-based phase (e.g. crude). Other oils that could be in an emulsion treated with the compositions described herein include, but are not necessarily limited to, shale oil, light oil, medium crudes, heavy crudes, bitumen, and the like.

The effective amount of the demulsifier or water clarifier added to the emulsion may range from about 0.1 ppm independently to about 50,000 ppm, alternatively from about 1 ppm independently to about 3000 ppm, or from about 5 ppm independently to about 1000 ppm.

A solvent and/or a second component may be added to the water-in-oil emulsion at the same time or a different time from the demulsifier or water clarifier. The solvent may be or include, but is not limited to a hydrocarbon-based solvent, an alcohol-based solvent, an organic carbonate-based solvent, a glycol, a polyglycol, a ketone, an ester, a diepoxide, an acetate, and mixtures thereof. The second component may be or include, but is not limited to a polyol, a diepoxide, and combinations thereof.

The additive may include the demulsifier or water clarifier in an amount ranging from about 5 wt % independently to about 90 wt %, alternatively from about 30 wt % independently to about 70 wt %. The additive may include the solvent in an amount ranging from about 5 wt % to about 90 wt %, alternatively from about 20 wt % independently to about 70 wt %. The additive may include a demulsifier (e.g. polyol) in an amount ranging from about 1 wt % independently to about 60 wt %, alternatively from about 3 wt % independently to about 20 wt %. The additive may include a demulsifier (e.g. diepoxide) in an amount ranging from about 1 wt % independently to about 60 wt %, alternatively from about 3 wt % independently to about 50 wt %.

In a non-limiting embodiment, a treated fluid composition is described. The treated fluid composition may include a water-in-oil emulsion (e.g. water-in-crude emulsion) and a modified demulsifier or water clarifier that separates water from the oil-in-water emulsion better as compared to an otherwise identical water-in-oil emulsion absent the demulsifier. The modified demulsifiers and modified water clarifiers described herein require lower doses, are faster, and leave less oil in the water phase as compared to demulsifiers and water clarifiers that are not modified as described.

It will be appreciated that the addition of the modifier to conventional demulsifiers or conventional water clarifiers can reduce activity of the product without losing performance. That is, the demulsifier or water clarifier may be used at the same concentration level (e.g. ppm) and get better water quality than the original product with higher activity. For instance, when the modified demulsifiers or water clarifiers are tested, they give better water quality and better dehydration than the original products that are 50% active; thus there are some synergies when the modifier is added to the demulsifier or water clarifier.

It will be further appreciated that the compositions and methods described herein can be practiced in the absence of a tannin component, such as those described in U.S. Patent Application Publication No. 2016/0032197, incorporated herein by reference in its entirety. Tannins are described therein as a family of polyphenolic compounds containing hydroxyl groups, and often carboxyl groups; and which in general tend to form complexes with proteins, other organic compounds and macromolecules.

The invention will be further described with respect to the following Examples, which are not meant to limit the invention, but rather to further illustrate the various embodiments.

EXAMPLES

A Canadian oil that was produced conventionally with a tight emulsion was used in these Examples. Bottle testing was conducted against a commercially available conventional demulsifier in oil (DMO; as contrasted with a demulsifier in water which would be designed as a DMW). The DMO was a 50% active product. To the DMO, 3 wt % of a cationic starch with a quaternized polyamine was added and the concentration of the product was reduced. This addition reduced the activity of the product to 16%, without a loss in performance, as will be demonstrated.

Figure 1:
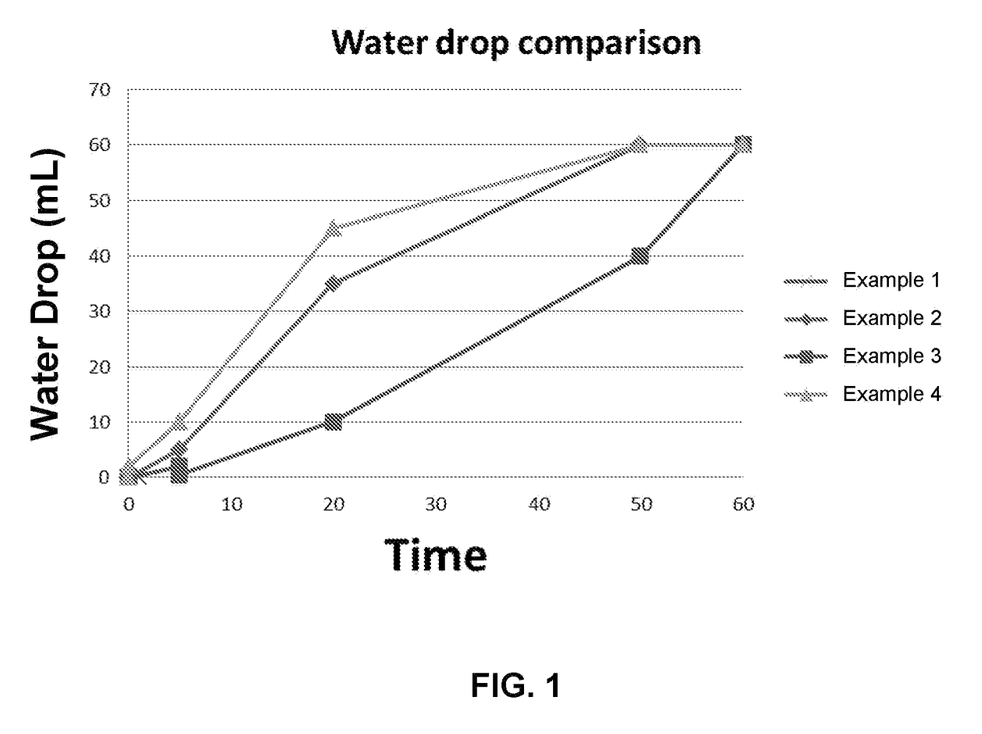
FIG. 1 is a water drop comparison graph showing milliliters of water separated as a function of time for a conventional demulsifier at two different concentrations as compared to the conventional demulsifier having a cationic starch added thereto, at the same concentrations.

FIG. 1 is a water drop comparison graph showing milliliters (mL) water as a function of time for a conventional demulsifier at two different concentrations as compared to the conventional demulsifier having the cationic starch added thereto, at the same concentrations, as defined in Table I. It should be noted that the curve for Example 1 is almost entirely covered by the curve for Example 3. FIG. 1 demonstrates that the performance of the modified DMO is the same as or very similar to the non-modified DMO.

TABLE I

Conventional Demulsifier With and Without Demulsifier Modifier

| Example | Description |
| --- | --- |
| 1 | DMO at 500 ppm |
| 2 | DMO at 1000 ppm |
| 3 | Modified DMO at 500 ppm |
| 4 | Modified DMO at 1000 ppm |

Figure 2:
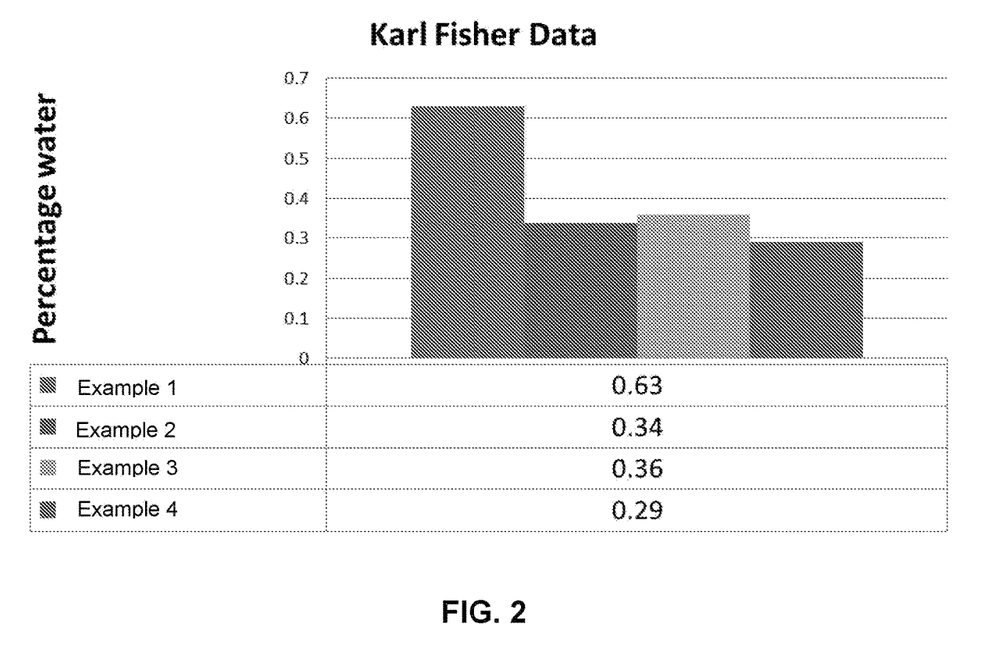
FIG. 2 is a chart showing the remaining water content of the crude oil after application of the conventional demulsifier at two different concentrations as compared to the conventional demulsifier having a cationic starch added thereto, at the same concentrations, used in the FIG. 1 graph.

FIG. 2 is a chart showing the water content for Examples 1 and 2 as compared to the Examples 3 and 4, at the same concentrations, respectively, used in the FIG. 1 graph. The samples were spun in a centrifuge to ensure that there was no BS (basic sediment) present. Thieved samples were injected into a Karl Fischer titrator to determine the water content presented in FIG. 2. It may be seen that Example 3 gave much lower % water than Example 1; and that Example 4 gave somewhat lower % water than Example 2.

Figure 3:
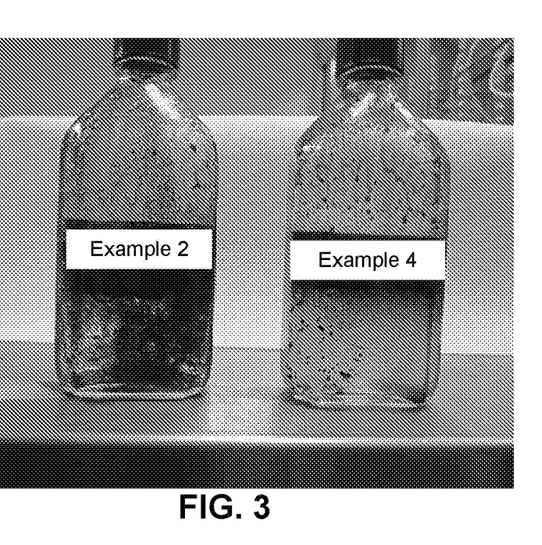
FIG. 3 is a photograph of two bottles comparing the conventional demulsifier (Example 2) with the conventional demulsifier having added cationic starch (Example 4) at 40° C. after 1 minute.
Figure 4:
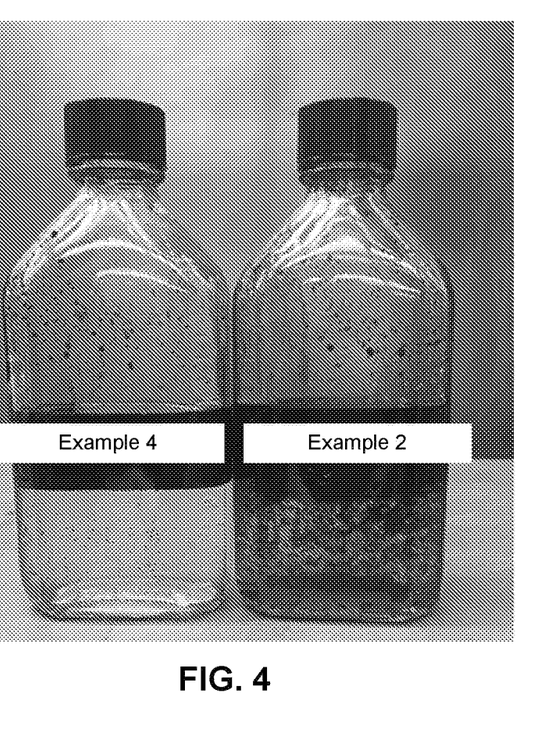
FIG. 4 is a photograph of the two bottles of FIG. 3 at 40° C. after 10 minutes.

Water quality comparisons are given in FIGS. 3 and 4. FIG. 3 is a comparison of Example 2 (on the left) with Example 4 (on the right) at 40° C. after 1 minute. It can be seen that after only one minute Example 4 gives noticeably better water quality than Example 2. FIG. 4 is a comparison of Example 2 (on the right) with Example 4 (on the left) at 40° C. after 10 minutes. It can also be seen that after ten minutes the difference in better water quality of Example 4 compared to Example 2 is dramatic.

Thus, it has been discovered that performance of the modified 16% active demulsifier is comparable, even showing better performance, to the 50% active product. The water quality of the modified demulsifier is much better than that of the conventional demulsifier alone. Further, the new formulation has also been found to be stable at a 60:40 ratio of water:methanol for winterizing purposes.

Further Examples

FIGS. 4-10 illustrate a process to optimize or find a "sweet spot" when modifying the demulsifiers or water clarifiers using the methods described herein. In this case, demulsifiers are used.

Photos are best for this explanation, and the final bottle test tells how the product drops water and the BS&W (basic sediment and water) cuts at a height 10-20 ml above interface.

Figure 5:
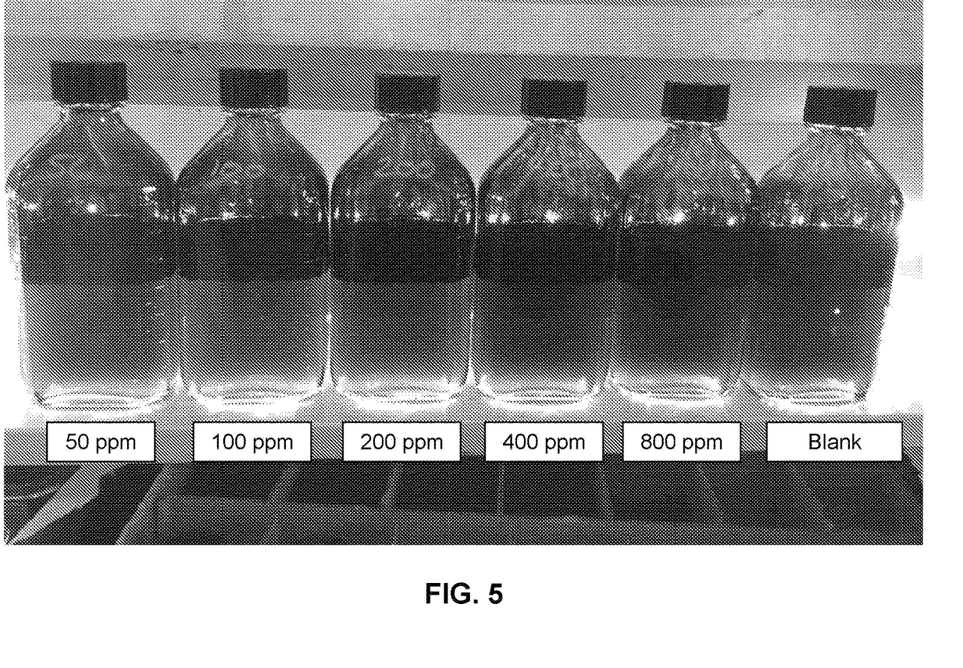
FIG. 5 is a photograph in which samples dosed with varying amounts of demulsifier and water clarifier are compared to determine of bottle test results used in screening if a product will work and at what proportion.

FIG. 5 is a photograph of bottle test results showing some screening on how it is determined if a product will work and at what dosage. As can be seen, the water quality in bottles labelled 100 ppm and 200 ppm look the best compared to the rest so this proportion range is the "sweet spot" to work with, where there is some leeway on side where acceptable results can still be obtained. These tests may be run several times to make sure repeatable results are obtained.

Figure 6:
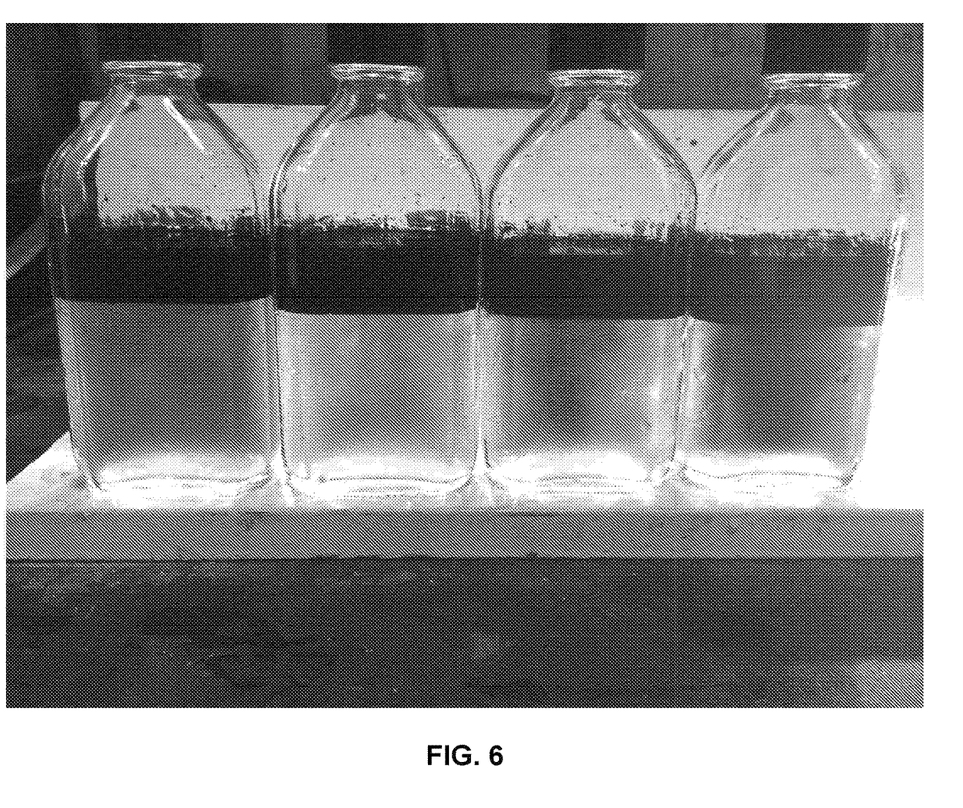
FIG. 6 is a photograph of a bottle test with water clarifier to determine at what dosage the water clarifier works best; the sample second from the left exhibited the best water quality.

FIG. 6 shows the bottles after dosing with water clarifier packages as described herein to determine the amount of intermediate required to improve water quality. As can be seen, the second bottle from the left is starting to show some good results and again there is a sweet spot, an undertreat and an over treat on either side.

Figure 7:
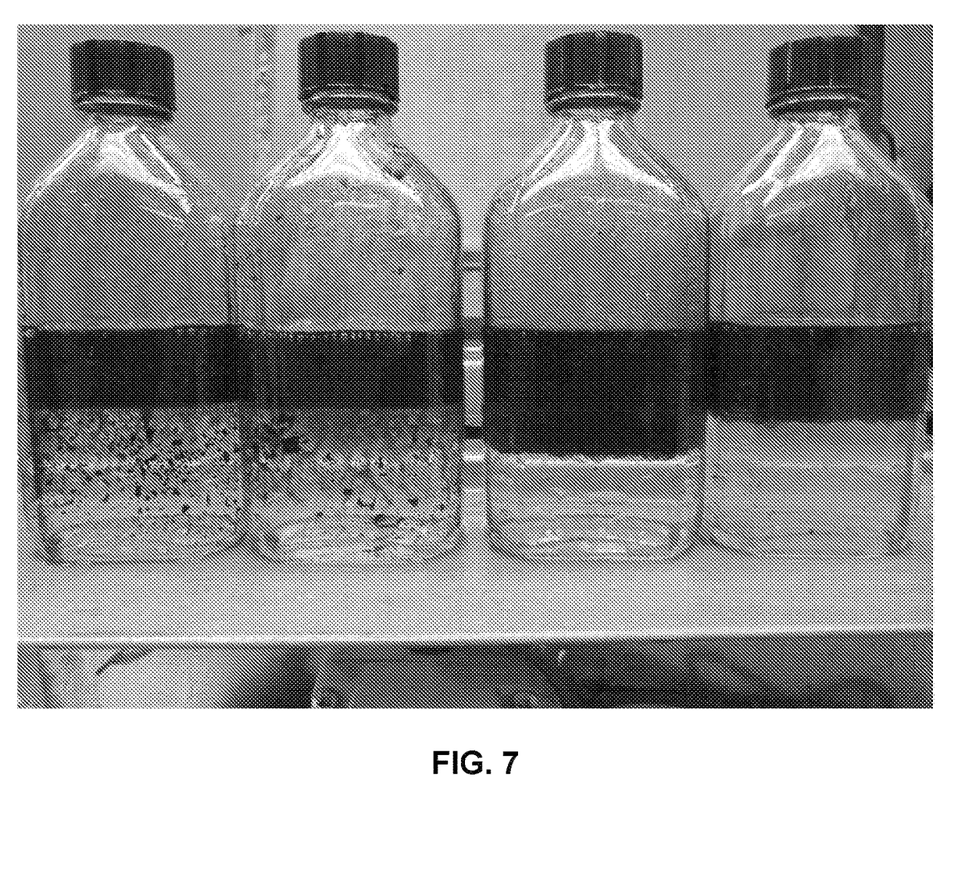
FIG. 7 is a photograph of a bottle test with incumbent demulsifier (two bottles on left, at two different dosages) compared to new, modified demulsifier/water clarifier product (two bottles on right, at two different dosages); the water quality of the modified demulsifier/water clarifier is better than demulsifier alone.

FIG. 7 shows the product that has been built on some different oil compared to an old product, even though the water drop is a little bit slower the end result turns out dry with minimal oil in water carryover. The experimental product described herein exhibited good performance when it was field trialed.

Figure 8:
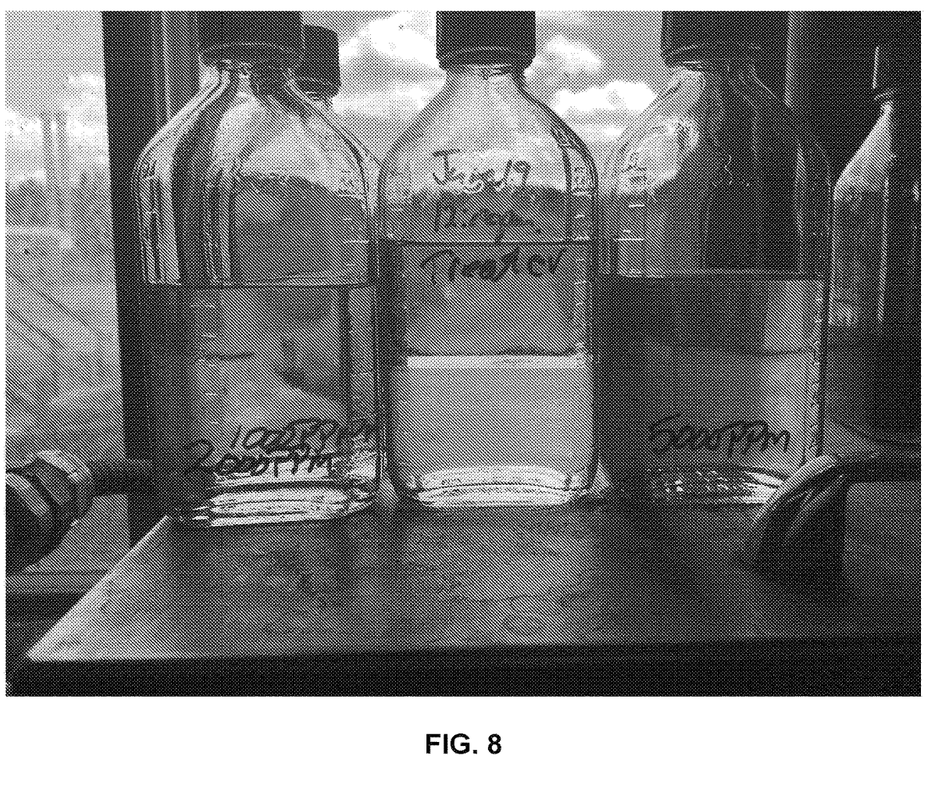
FIG. 8 is a photograph of an oil carry over analysis at the start of a plant trial without a new product in the system; the oil in water content was estimated to be about 3000 ppm.

FIG. 8 shows an oil in water analysis before the start of a plant trial without the new product in the system. Oil-in-waters were around 3000 ppm.

Figure 9:
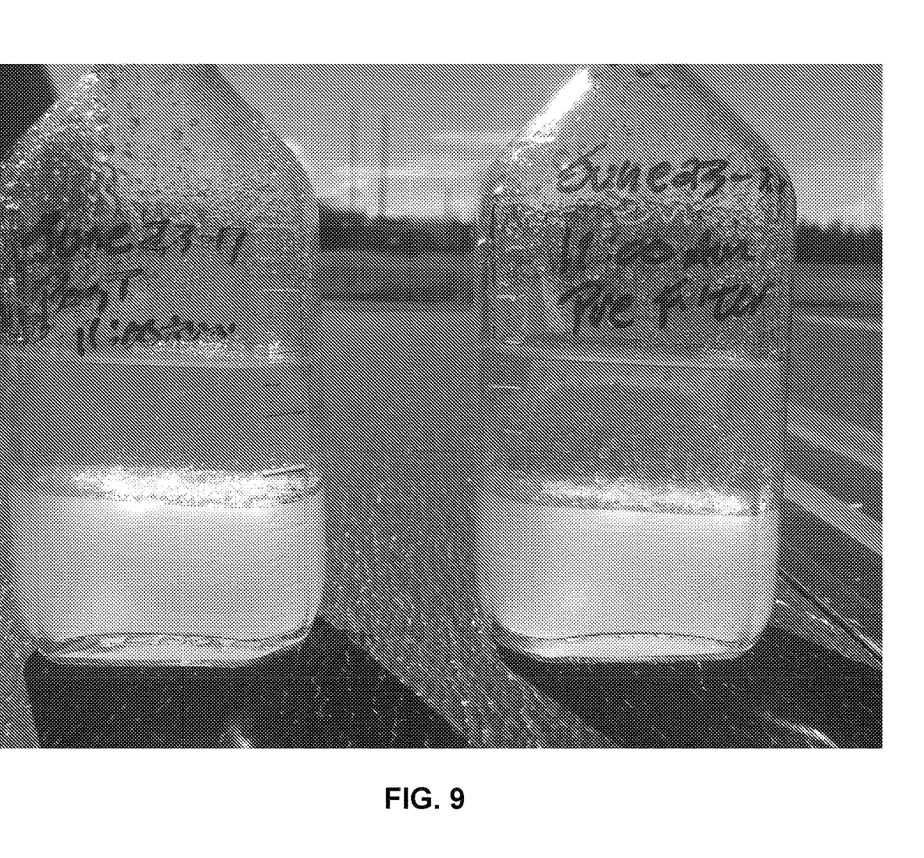
FIG. 9 is a photograph of an oil carry over analysis during the plant trial. The amount of oil-in-water as visually undetectable.

FIG. 9 shows the result of an oil in water analysis after a week of treating with the oil in water being visually undetectable.

Figure 10:
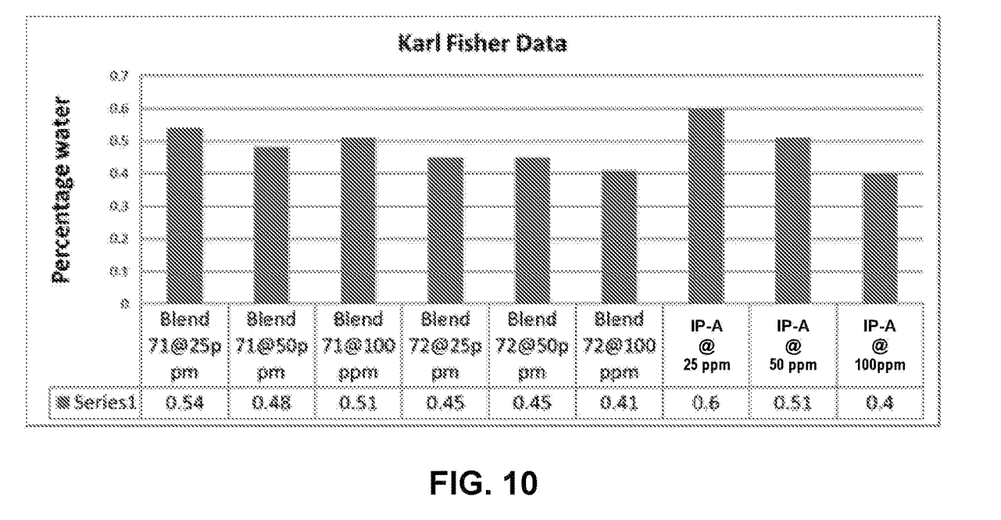
FIG. 10 is a chart in which the water content of an oil was compared amongst three products an experimental Blend 71, and experimental Blend 72, and the Incumbent Product A (abbreviated "IP-A") after allowing 10 minutes for separation at ambient temperature. Each product was dosed at 25, 50, and 100 ppm. Blend 72 performed better by exhibiting lower overall water content.

FIG. 10 is a chart showing the water content of the product (Blend 72) after 10 minutes settling at ambient temperature compared to the Incumbent Product A (IP-A); the percentage water is clearly lower for the Blend 72 product. To support this data, during the field trial the final dosage was reduced to 25 ppm after which the sales oil continued to meet pipeline specification for BS&W (0.5%).

In the foregoing specification, the invention has been described with reference to specific embodiments thereof, and has been described as effective in providing methods and compositions for separating a water-in-oil emulsion. However, it will be evident that various modifications and changes can be made thereto without departing from the broader scope of the invention as set forth in the appended claims. Accordingly, the specification is to be regarded in an illustrative rather than a restrictive sense. For example, specific demulsifiers, water clarifiers, demulsifier modifiers, heavy crude oils, solvents, alcohols, and the like falling within the claimed parameters, but not specifically identified or tried in a particular composition or method, are expected to be within the scope of this invention.

The present invention may suitably comprise, consist of or consist essentially of the elements disclosed and may be practiced in the absence of an element not disclosed. For instance, the method of modifying demulsifier or water clarifier activity may comprise, consist essentially of, or consist of adding a cationic starch and/or an anionic starch to a demulsifier or water clarifier in an amount effective to reduce the activity of the demulsifier or water clarifier without substantially reducing its performance.

Further, the modified demulsifier or water clarifier composition may comprise, consist of or consist essentially of a demulsifier or water clarifier and a cationic starch and/or an anionic starch present in an amount effective to reduce the activity of the demulsifier or water clarifier without substantially reducing its performance, optionally with an alcohol.

There may also be provided a method of separating oil and water from an emulsion containing oil and water, where the method comprises, consists essentially of or consists of introducing a modified demulsifier or water clarifier to the emulsion in an amount effective to separate at least a portion of the oil and at least a portion of the water from each other, where the modified demulsifier or water clarifier comprises, consists essentially of, or consists of a demulsifier or water clarifier and a cationic starch and/or an anionic starch present in an amount effective to reduce the activity of the demulsifier or water clarifier without reducing its performance, and further separating at least a portion of the oil and at least a portion of the water from each other.

As used herein, the terms "comprising," "including," "containing," "characterized by," and grammatical equivalents thereof are inclusive or open-ended terms that do not exclude additional, unrecited elements or method acts, but also include the more restrictive terms "consisting of" and "consisting essentially of" and grammatical equivalents thereof. As used herein, the term "may" with respect to a material, structure, feature or method act indicates that such is contemplated for use in implementation of an embodiment of the disclosure and such term is used in preference to the more restrictive term "is" so as to avoid any implication that other, compatible materials, structures, features and methods usable in combination therewith should or must be, excluded.

As used herein, the singular forms "a," "an," and "the" are intended to include the plural forms as well, unless the context clearly indicates otherwise.

As used herein, the term "and/or" includes any and all combinations of one or more of the associated listed items.

As used herein, relational terms, such as "first," "second," "top," "bottom," "upper," "lower," "over," "under," etc., are used for clarity and convenience in understanding the disclosure and do not connote or depend on any specific preference, orientation, or order, except where the context clearly indicates otherwise.

As used herein, the term "substantially" in reference to a given parameter, property, or condition means and includes to a degree that one of ordinary skill in the art would understand that the given parameter, property, or condition is met with a degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

As used herein, the term "about" in reference to a given parameter is inclusive of the stated value and has the meaning dictated by the context (e.g., it includes the degree of error associated with measurement of the given parameter).

What is claimed is:

1. A modified demulsifier or water clarifier comprising:
    a modified compound selected from the group consisting of:
        a demulsifier selected from the group consisting of alkylarylsulfonate amine salts, furandione polymers, oxyalkylated alkanolamines, oxyalkylated polyamines, oxyalkylated imine polymers, oxyalkylated polyols, (methyl) oxirane polymers, polyether polyols, polyoxyalkylenes, polyesters, polyglycol diepoxides, polyglycol esters, and mixtures thereof; and
        a water clarifier selected from the group consisting of a polycondensate based on N,N'-bis[3-(dimethylamino) propyl]urea, polycondensate based on alkanolamines, triethanolamines, and combinations of these water clarifiers; and
    a cationic starch and/or an anionic starch present in an amount effective to reduce activity of the modified compound to at least 2% without reducing its performance, wherein the effective amount of the cationic starch and/or the anionic starch ranges from 0.1 to 3 wt. %, based on the modified compound.

2. The modified demulsifier or water clarifier of claim 1 further comprising a quaternized polyamine.

3. The modified demulsifier or water clarifier of claim 1 where activity of the modified compound is reduced to at least 5%.

4. The modified demulsifier or water clarifier of claim 1 further comprising an alcohol.

5. The modified demulsifier or water clarifier of claim 1, wherein the demulsifier is selected from the group consisting of alkylarylsulfonate amine salts, oxyalkylated alkanolamines, oxyalkylated imine polymers, polyesters, polyglycol diepoxides, polyglycol esters, and mixtures thereof.

6. The modified demulsifier or water clarifier of claim 1, wherein the modified compound is a water clarifier selected from the group consisting of a polycondensate based on N,N'-bis[3-(dimethylamino) propyl]urea, polycondensate based on alkanolamines, triethanolamines, and combinations of these water clarifiers.

7. A modified demulsifier comprising:
 a modified compound, wherein the modified compound is a demulsifier selected from the group consisting of alkylarylsulfonate amine salts, oxyalkylated alkanolamines, oxyalkylated imine polymers, polyesters, polyglycol diepoxides, polyglycol esters, and mixtures thereof;
 a cationic starch and/or an anionic starch, wherein the amount of the cationic starch and/or the anionic starch ranges from 0.1 to 3 wt. %, based on the demulsifier; and
 an alcohol.

8. A modified water clarifier comprising:
 a modified compound, wherein the modified compound is a water clarifier selected from the group consisting of a polycondensate based on N,N'-bis[3-(dimethylamino) propyl]urea, polycondensate based on alkanolamines, triethanolamines, and combinations of these water clarifiers;
 a cationic starch and/or an anionic starch, wherein the amount of the cationic starch and/or the anionic starch ranges from 0.1 to 3 wt. %, based on the water clarifier; and
 an alcohol.

\* \* \* \* \*